(No Model.)
T. GUILLEAUME.
ELECTRIC CABLE.
No. 563,274. Patented July 7, 1896.
*Fig. 1.*
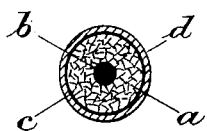
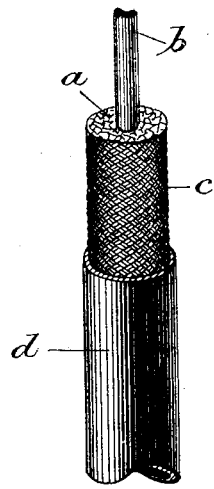
*Fig. 2.*
Witnesses.
Georg Müller
C. Altgeld
Inventor.
Theodor Guilleaume

UNITED STATES PATENT OFFICE.

THEODORE GUILLEAUME, OF MÜLHEIM-ON-THE-RHINE, GERMANY.

ELECTRIC CABLE.

SPECIFICATION forming part of Letters Patent No. 563,274, dated July 7, 1896.

Application filed November 2, 1895. Serial No. 567,758. (No model.) Patented in Germany June 21, 1894, No. 82,700; in Belgium July 3, 1894, No. 110,785; in France July 4, 1894, No. 239,802; in England July 6, 1894, No. 13,160; in Austria August 13, 1894, No. 44/4,002, and in Hungary September 15, 1894, No. 1,115.

*To all whom it may concern:*

Be it known that I, THEODORE GUILLEAUME, a subject of the German Emperor, residing at Mülheim-on-the-Rhine, in the German Empire, have invented new and useful Improvements in the Manufacture of Electric Cables, (in respect whereof I have obtained patents in the following countries: in Germany, No. 82,700, dated June 21, 1894; in Belgium, No. 110,785, dated July 3, 1894; in France, No. 239,802, dated July 4, 1894; in Great Britain, by my agent, No. 13,160, dated July 6, 1894; in Austria, No. 44/4,002, dated August 13, 1894, and in Hungary, No. 1,115, dated September 15, 1894,) of which the following is a specification.

This invention relates to the manufacture of electric cables, its object being to produce a cable of low capacity in which the insulating material is light and inexpensive, and, without breaking, will readily accommodate itself to the form of the cable when bent.

In the accompanying drawings, Figure 1 represents in transverse section a cable constructed in accordance with this invention, the conductor being insulated by means of vegetable or other suitable fiber or bark. Fig. 2 is an elevation thereof.

In carrying out this invention grated or ground vegetable fiber (such as cellulose, cork, tan, and the like) or other suitable fiber or bark $a$ is employed for insulating the conductor $b$. The fiber may be in a natural state or may be saturated with an insulating substance, such as paraffin, resin, or oil. About the insulation $a$, for the purpose of retaining same in position, is laid or formed a braiding or tubular covering $c$. The conductor $b$ may be a solid wire, or it may be composed of several wires or several strands of wire twisted together, and there may be more than one conductor. The insulating material may be applied in such quantity as to render the cable capable of floating in water.

On account of the porous nature of the insulating material a cable constructed in the improved manner herein described has a low capacity.

For affording protection against injury the cable may be furnished with a sheathing $d$ of lead, iron, tape, or the like.

The improved cable may be manufactured with the aid of a machine, through which the conductor or conductors $b$ is or are drawn at a speed corresponding with that at which the braiding or tubular covering $c$ is produced and applied, the space between the latter and the conductor or conductors being meanwhile filled at a corresponding speed with the insulating material $a$.

What I claim as my invention, and desire to secure by Letters Patent, is—

1. An electric cable in which grated or ground vegetable fiber or bark (such as cellulose, cork, tan and the like) either in a natural state or saturated with an insulating substance is employed as the insulating medium, the latter being retained in position about the conductor by means of a braiding or tubular covering, substantially as herein described.

2. In an electric cable, the combination, with a conductor $b$, of grated or ground vegetable or other fiber or bark $a$, suitable for insulating, surrounding the said conductor, and a braiding or tubular covering $c$, inclosing the said insulating material, substantially as and for the purpose set forth.

THEODORE GUILLEAUME.

Witnesses:
 MARIA NAGEL,
 WILLIAM H. MADDEN.